(12) United States Patent
Mitani (10) Patent No.: US 10,203,473 B2
(45) Date of Patent: Feb. 12, 2019

(54) LENS BARREL

(71) Applicant: Konica Minolta, Inc., Tokyo (JP)

(72) Inventor: Yoshifumi Mitani, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/706,951

(22) Filed: Sep. 18, 2017

(65) Prior Publication Data

US 2018/0081145 A1 Mar. 22, 2018

(30) Foreign Application Priority Data

Sep. 20, 2016 (JP) ................................. 2016-182783

(51) Int. Cl.
| | |
|---|---|
| *G02B 7/10* | (2006.01) |
| *G02B 7/09* | (2006.01) |
| *G02B 13/00* | (2006.01) |
| *G02B 15/14* | (2006.01) |
| *G03B 3/10* | (2006.01) |
| *G03B 5/06* | (2006.01) |
| *G03B 17/56* | (2006.01) |

(52) U.S. Cl.
CPC ................. *G02B 7/10* (2013.01); *G02B 7/09* (2013.01); *G02B 13/009* (2013.01); *G02B 15/14* (2013.01); *G03B 3/10* (2013.01); *G03B 5/06* (2013.01); *G03B 17/565* (2013.01)

(58) Field of Classification Search
CPC . G02B 7/10; G02B 15/14; G02B 7/09; G02B 13/009; G03B 3/10
See application file for complete search history.

(56) References Cited

FOREIGN PATENT DOCUMENTS

JP 2009-156960 A 7/2009

*Primary Examiner* — Jack Dinh
(74) *Attorney, Agent, or Firm* — Osha Liang LLP (57) ABSTRACT

A lens barrel includes a frame body, a frame body holder that holds the frame body, and an adjuster adjusting the inclination of the frame relative to a predetermined axis of the frame body holder. The adjuster includes an adjustment screw having a screw shaft with an external thread portion formed thereon, an internal thread portion screwed together with the external thread portion, a through hole formed in the frame body, a contact portion that is provided at a circumferential portion of the through hole, a hole portion formed in the frame body holder so as to be continuous with the internal thread portion, and a fitting portion extending from the external thread portion toward the screw tip of the adjustment screw with a fitting portion to be fitted into the hole portion.

7 Claims, 5 Drawing Sheets

LENS BARREL

CROSS-REFERENCE TO RELATED APPLICATIONS

Japanese Patent Application No. 2016-182783 filed on Sep. 20, 2016 including description, claims, drawings, and abstract the entire disclosure is incorporated herein by reference in its entirety.

BACKGROUND

Technological Field

The present invention relates to a lens barrel.

Description of the Related Art

In recent years, quality required for lens barrels has increased, and compatibility between high performance and high reliability has been required. Therefore, in order to improve optical performance, a lens barrel capable of adjusting the inclination of the lens with respect to the optical axis direction has been proposed as disclosed in JP 2009-156960 A. The lens barrel described in JP 2009-156960 A includes a cylindrical body, a holding frame that holds an optical element that is disposed so as to be tiltable with respect to the cylindrical body, and a spacer that is disposed between the cylindrical body and the holding frame. The spacer is movable between a first position for positioning the holding frame at a reference position, being at a position for rotating the holding frame at a predetermined angle from the first position around the center axis of the cylindrical body, and a second position that can adjust the inclination of the holding frame.

In the lens barrel described in JP 2009-156960 A, the inclination and position with respect to the optical axis direction of the holding frame can be adjusted in a state where the spacer is disposed at the adjustment position.

In the lens barrel described in JP 2009-156960 A, three adjustment screws are provided at substantially equal intervals along the circumferential direction of the holding frame, and these adjustment screws are screwed into the screw holes. By tightening or loosening these three adjustment screws, the inclination and position of the holding frame with respect to the optical axis direction are adjusted. In the lens barrel described in Patent Document 1 using an adjustment screw, adjustment of the inclination of the optical element more precisely with respect to the optical axis direction was desired.

SUMMARY

The lens barrel of one or more embodiments of the present invention can accurately adjust the inclination of the frame body with respect to a predetermined axis of the frame body holder so that the optical axis of the optical element is parallel to a predetermined axis of the frame body holder.

A lens barrel reflecting one or more embodiments of the present invention comprises: a frame body that holds an optical element, a cylindrical frame body holder that holds the frame body, and an adjuster that adjusts an inclination of the frame body with respect to a predetermined axis of the frame body holder so that an optical axis of the optical element is parallel to the predetermined axis of the frame body holder. The adjuster includes an adjustment screw having a screw head, a threaded shaft forming an external thread portion, and an internal thread portion, extending in a direction parallel to the optical axis, that is formed in the frame body holder to be screwed together with the external thread portion, a through hole, being bored in the frame body, in a direction parallel to the optical axis, a contact portion that is provided at a circumferential portion of the through hole to be brought into contact with the screw head when the screw shaft is inserted in the through hole, and a hole portion formed in the frame body holder so as to be continuous with the internal thread portion. The screw shaft further includes a fitting portion extending from the external threaded portion toward the screw tip of the adjustment screw, and the fitting portion fits into the hole portion.

In one or more embodiments, the adjustment screw has a screw head and a screw shaft having a external threaded portion formed therein. A through hole is formed in the frame body that holds the optical element along a direction parallel to the optical axis of the optical element. When the screw shaft is inserted through the through hole, the contact portion around the through hole comes into contact with the screw head. The frame body holder is formed with an internal thread portion so as to extend along a direction parallel to the optical axis and be screwed with the external thread portion. Further, the frame body holder has a hole continuously formed in the internal thread portion. The screw shaft has a fitting portion extending to the screw tip side of the adjustment screw. The fitting portion is fitted into a hole formed in the frame body holder.

In one or more embodiments, because the internal thread portion is formed along the direction parallel to the optical axis and the contact portion of the frame body is in contact with the screw head, when the adjustment screw is tightened or loosened in a state where the external thread portion of the adjustment screw and the internal thread portion of the frame body holder are screwed together, the angle of the optical axis direction of the frame body with respect to the frame body holder is adjusted.

At this time, in one or more embodiments, allowance may be provided between the externally threaded portion and the internal thread portion so that the adjustment screw can be tightened or loosened smoothly. In that case, when the orientation of the adjustment screw is defined only by the internal thread portion, since allowance is provided, the external thread portion rattles in the internal thread portion. Consequently, the orientation of the adjustment screw cannot be precisely determined.

On the other hand, in one or more embodiments, the orientation of the adjustment screw is defined by the hole formed in the frame body holder by fitting of the fitting portion. In this case, there is little clearance between the hole and the fitting portion because no allowance is required. Accordingly, the orientation of the adjustment screw is determined with high accuracy by the hole formed in the frame body holder. As a result, according to this aspect, it is possible to accurately adjust the inclination of the frame body with respect to the predetermined axis of the frame body holder so that the optical axis of the optical element is parallel to the predetermined axis of the frame body holder.

In one or more embodiments, for example, a biasing member which biases in the direction in which the frame body separates from the frame body holder is disposed in-between the frame body and frame body holder such that the contact portion contacts the screw head.

In one or more embodiments, the biasing member disposed between the frame body and the frame body holder urges the frame body away from the frame body holder so that the contact portion abuts the screw head. Therefore, when the adjustment screw is rotated in the tightening direction, the contact portion is pushed by the screw head, so that the frame body approaches the frame body holder against the biasing force of the biasing member. On the other hand, when the adjustment screw is rotated in the loosening direction, the state where the contact portion is in contact with the screw head is maintained by the biasing force of the biasing member and the frame body separates from the frame body holder. As a result, according to this aspect, it is possible to accurately move the frame body toward and away from the frame body holder.

In one or more embodiments, for example, both the frame body holder and the adjustment screw may be made of metal.

In one or more embodiments, for example, the internal thread portion may be formed in advance in the frame body holder.

In one or more embodiments, the internal thread portion is formed in advance in the frame body holder. In addition, both the frame body holder and the adjustment screw are made of a metal. For this reason, allowance is provided between the external threaded portion of the adjustment screw and the internal thread portion of the frame body holder so that the adjustment screw can be loosened and tightened smoothly. Therefore, when the orientation of the adjustment screw is defined by the internal thread portion, due to this allowance, the external thread portion rattles in the internal thread portion. Consequently, the orientation of the adjustment screw cannot be precisely determined.

On the other hand, in one or more embodiments of the invention, the orientation of the adjustment screw is defined by the hole formed in the frame body holder by fitting of the fitting portion. In this case, there is little clearance between the hole and the fitting portion because no allowance is required. Accordingly, the orientation of the adjustment screw is determined with high accuracy by the hole formed in the frame body holder. As a result, according to this aspect, it is possible to accurately adjust the inclination of the frame body with respect to the predetermined axis of the frame body holder so that the optical axis of the optical element is parallel to the predetermined axis of the frame body holder.

In one or more embodiments, for example, the screw shaft may further include a positioning portion formed between the screw head and the external thread portion, and inserted into the through hole.

In one or more embodiments, a positioning portion, which is inserted into the through hole, is formed between the screw head and the external thread portion of the adjustment screw of the screw shaft. For this reason, the orientation of the adjustment screw is also defined by the through hole through which the positioning portion is inserted. No allowance is required between the positioning part and the through hole, so there is almost no gap. Therefore, the orientation of the adjustment screw is determined with high accuracy by the hole portion formed in the frame body holder and the through hole drilled in the frame body. As a result, according to this aspect, it is possible to accurately adjust the inclination of the frame body with respect to the predetermined axis of the frame body holder so that the optical axis of the optical element is parallel to the predetermined axis of the frame body holder.

In one or more embodiments, for example, the adjuster may be provided at three positions along the circumferential direction of the frame body holder.

In one or more embodiments, the adjuster is provided at three positions along the circumferential direction of the frame body holder. Therefore, by loosening or tightening all three adjustment screws, it is possible to move the frame body in the optical axis direction with respect to the frame body holder. Also, by loosening or tightening one or two adjustment screws, the inclination of the frame body with respect to the predetermined axis of the frame body holder can be adjusted.

In one or more embodiments, the adjuster may be provided at three positions at equal gaps along the circumferential direction of the frame body holder.

In one or more embodiments, for example, the through hole may be formed as an elongated hole whose length in the radial direction is longer than the length in the circumferential direction of the frame body holder in a plan view as viewed from a direction parallel to the optical axis.

In one or more embodiments, the through hole is formed as an elongated hole whose length in the radial direction is longer than the length in the circumferential direction of the frame body holder in a plan view seen from a direction parallel to the optical axis. For this reason, in the three adjusters, a gap is generated between the positioning portion of the adjustment screw and the through hole. Therefore, according to this aspect, it is possible to avoid excessive restraint of the frame body.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention, and wherein.

DETAILED DESCRIPTION

Hereinafter, one or more embodiments of the present invention will be described with reference to the drawings. However, the scope of the invention is not limited to the disclosed embodiments.

(Background)

As described above, in the lens barrel of JP 2009-156960 A, three adjustment screws are screwed into screw holes, and by tightening or loosening these three adjustment screws, the inclination with respect to the optical axis of the holding frame and position are adjusted.

An allowance is provided between the adjustment screw with the external thread formed between it and the threaded hole with the internal thread so that the adjustment screw can be tightened and loosened smoothly. Due to this allowance, the inventor of the present invention found that the adjustment screw is tilted at a minute angle with respect to the screw hole, so that the adjustment precision of the inclination and position of the holding frame with respect to the optical axis is reduced. On the other hand, the allowance provided between the adjustment screw and the screw hole is essential for enabling the adjustment screw to be tightened and loosened smoothly. Especially when the external thread and the internal thread are made of metal, allowance is important.

One or more embodiments of the present invention can accurately adjust the inclination and position of the holding frame with respect to the optical axis, even if allowance is provided between the adjustment screw and screw hole. The configuration prevents the adjustment screw from being tilted with respect to the screw hole.

Embodiments

Hereinafter, embodiments of the present disclosure will be described with reference to the drawings. In each drawing, the same reference numerals are given to the same elements, and the description thereof is omitted as appropriate.

Figure 1:
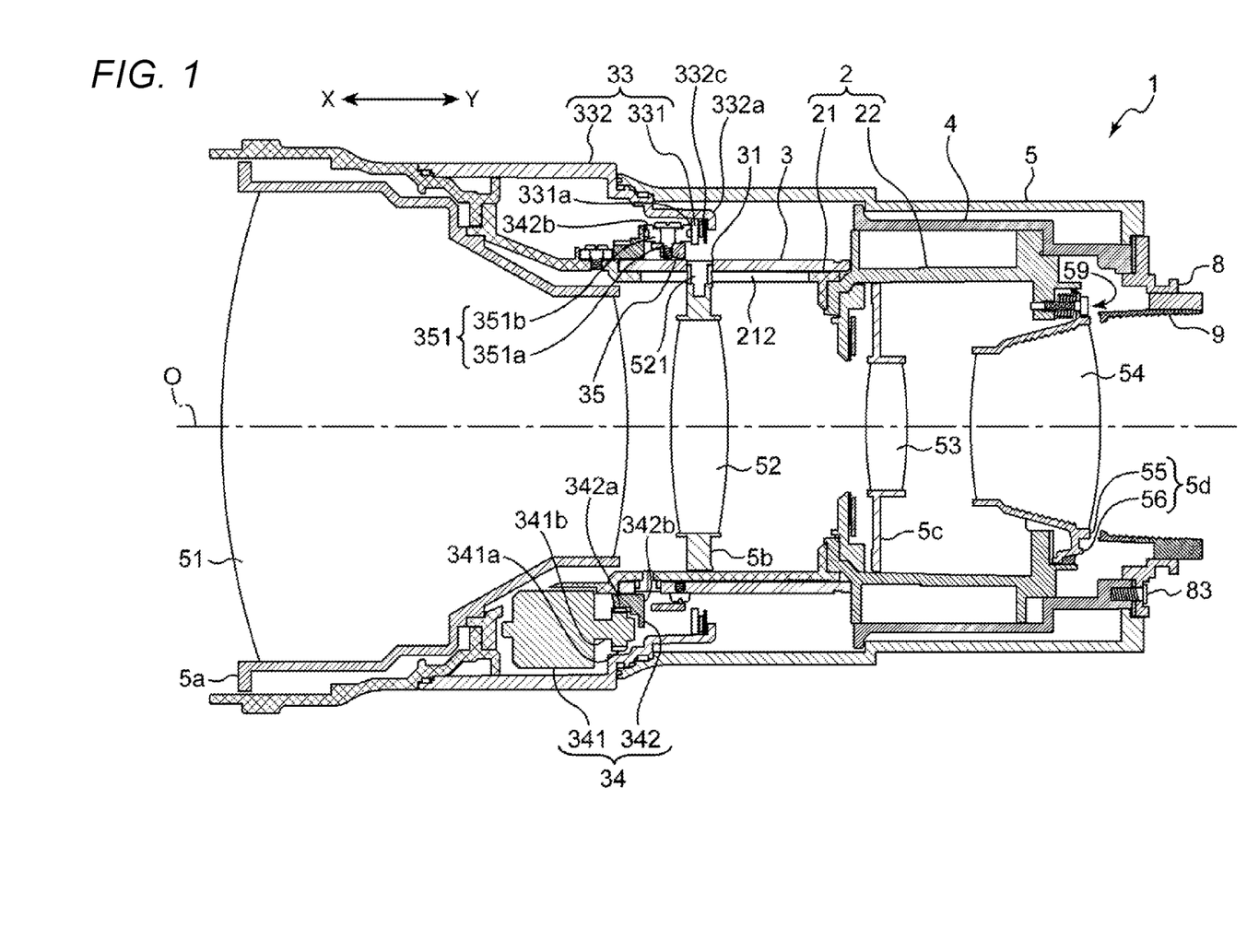
FIG. 1 is a cross-sectional view of a lens barrel according to one or more embodiments of the present invention.
Figure 2:
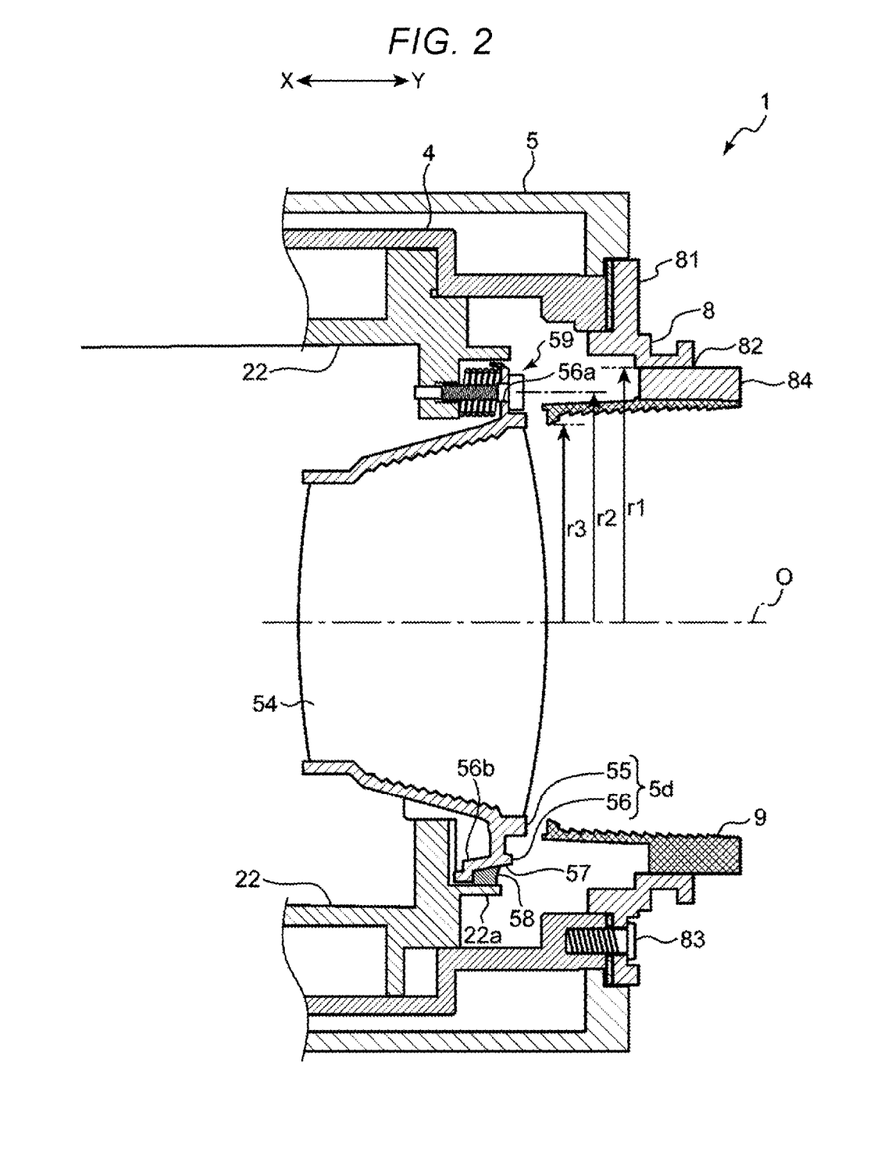
FIG. 2 is an enlarged cross-sectional view of the main part of the lens barrel in FIG. 1.
Figure 3:
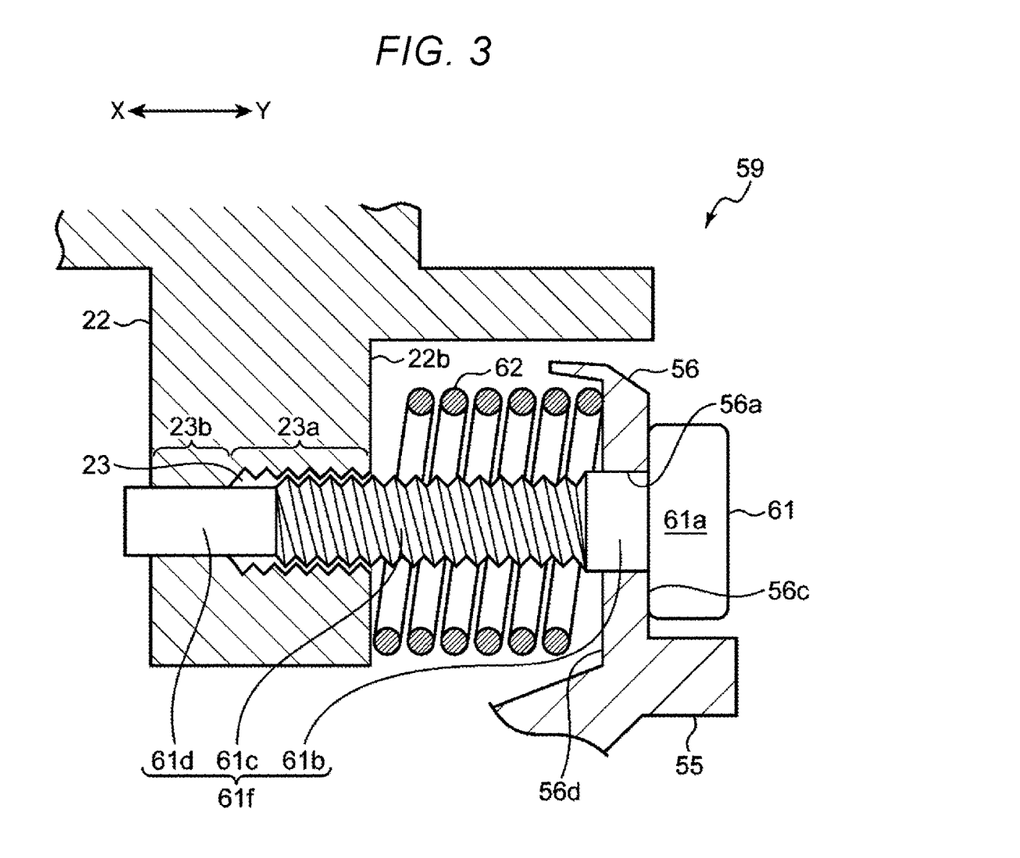
FIG. 3 is an enlarged cross-sectional view of the adjuster of the lens barrel in FIGS. 1 and 2.
Figure 4:
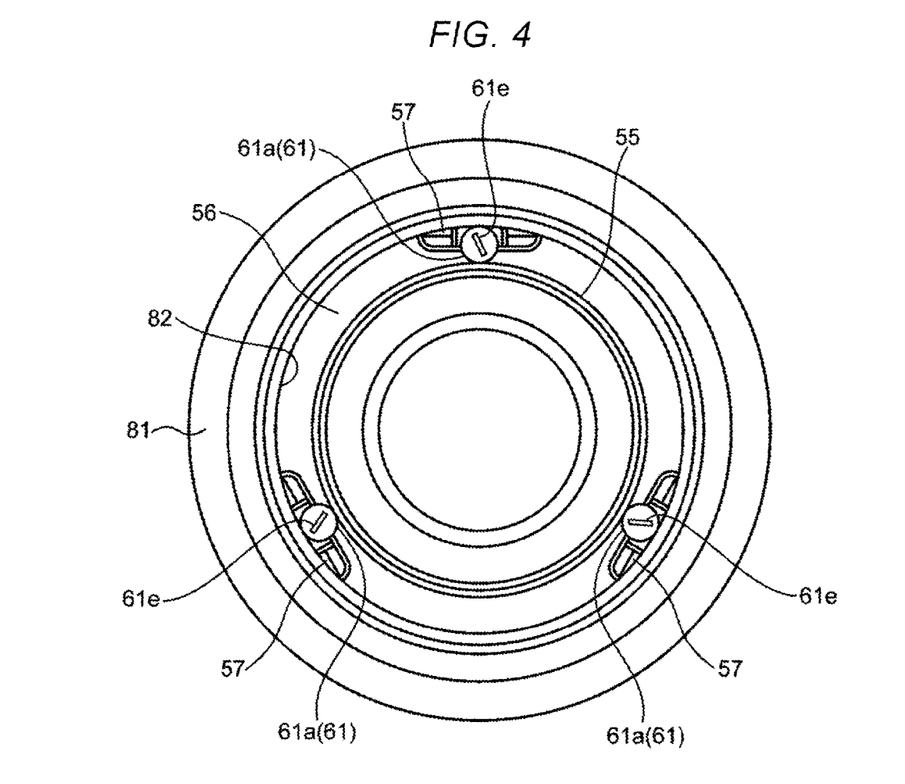
FIG. 4 is a view of the opening portion of the mount member of the lens barrel in FIG. 1, as viewed from the image side.

FIG. 1 is a cross-sectional view of a lens barrel according to one or more embodiments of the invention. FIG. 2 is an enlarged cross-sectional view of the main part of the lens barrel in FIG. 1. FIG. 3 is an enlarged cross-sectional view of the adjuster of the lens barrel in FIGS. 1 and 2. FIG. 4 is a view of the opening portion of the mount member of the lens barrel in FIG. 1, as viewed from the image side. In each figure, the X direction is the object side and the Y direction is the image side.

As shown in FIG. 1, the lens barrel 1 of one or more embodiments of the invention includes a fixed cylinder (frame body holder) 2, a cam cylinder 3, a mount member 8, a cover member 9, and lens group holding frames 5a to 5d. The lens group holding frames 5a to 5d hold the lenses 51 to 54, respectively.

The fixed cylinder 2 includes a first fixed cylinder 21 and a second fixed cylinder 22. The first fixed cylinder 21 is made of metal and has a cylindrical shape. The first fixed cylinder 21 has a guide groove 212 formed that passes through from the inner periphery to the outer periphery along the axial direction.

The second fixed cylinder 22 (an example of a frame body holder) is made of metal and has a cylindrical shape. The second fixed cylinder 22 is fixed to the end portion on the image side (Y direction) of the first fixed cylinder 21. The second fixed cylinder 22 holds the lens group holding frames 5 c and 5 d. The second fixed cylinder 22 is fixed to the reinforcing member 4 by bolts (not shown) such that it is housed in the inner periphery of the reinforcing member 4.

The reinforcing member 4 is made of metal and has a substantially cylindrical shape. The outer periphery of reinforcing member 4 is covered with an exterior member 5 disposed on the outer circumferential side.

The mount member 8 detachably mounts the lens barrel 1 to a camera body (not shown). The mount member 8 includes a reference end portion 81 and an opening 82. The reference end portion 81 is an end portion on the image side (Y direction) of the mount member 8, and is substantially formed over the entire circumference. The reference end portion 81 forms a reference surface to which the camera body is attached.

The opening 82 is formed at the center portion of the mount member 8. The opening 82 is formed such that the central portion of the mount member 8 is penetrated from the object side (X direction) to the image side (Y direction) so that light can pass in the optical axis direction (XY direction) and light passing through the lens group 51 to 54 can be guided to the camera body. The opening 82 is provided with an electrical contact portion 84 for electrically connecting the lens barrel 1 and the camera body to exchange information between the lens barrel 1 and camera body.

The mount member 8 is fixed to the reinforcing member 4 by a fixing bolt 83. Thereby, the mount member 8 is fixed to the second fixed cylinder 22 via the reinforcing member 4. In FIG. 4, illustration of the fixing bolt 83 is omitted.

The cover member 9 has a substantially cylindrical shape. The cover member 9 is formed in such a size that its inner circumference diameter covers a region other than the optically used range in the opening 82 of the mount member 8. The cover member 9 is attached such that the outer periphery thereof is fitted into the inner periphery of the mount member 8.

The cam cylinder 3 moves and operates the lens group 52 in the optical axis direction (XY direction). The cam cylinder 3 is composed of a cylindrical body and is provided with a cam groove 31. The cam groove 31 is formed to be inclined in the axial direction. As shown in FIG. 1, the guide shaft 521 of the lens group 52 is inserted, in a movable state, in the cam groove 31.

The cam cylinder 3 is disposed on the outer periphery of a part of the first fixed cylinder 21 on the image side (Y direction) so as not to be movable in the axial direction with respect to the first fixed cylinder 21 and freely rotating around the optical axis (around the axis of the first fixed cylinder 21).

The lens group holding frames 5a to 5d are arranged in order from the object side (X direction) to the image side (Y direction). The lens group holding frame 5a holds a lens group 51 having one or a plurality of lenses (optical elements), and is held in a fixed manner by the first fixed cylinder 21. The lens group holding frame 5b holds the lens group 52 having one lens or a plurality of lenses and is movable in the optical axis direction (axial direction of the first fixed cylinder 21, XY direction) in the first fixed cylinder 21. The lens group holding frame 5b has a guide shaft 521, in a movable manner, inserted into the guide groove 212 of the first fixed cylinder 21 and the cam groove 31 of the cam cylinder 3 on the outer circumference. As the guide shaft 521 is guided and moved along the guide groove 212 and the cam groove 31 with the rotation of the cam cylinder 3, the lens group 52 moves in the optical axis direction (XY direction).

More specifically, the cam cylinder 3 is rotated by a rotating operation member that rotates the cam cylinder 3, and the lens group 52 is moved in the optical axis direction (XY direction) along with the rotation of the cam cylinder 3. The rotation operation member of one or more embodiments of the invention includes a manual focus operation member 33, an auto focus operation member 34, and an output ring 35.

The autofocus operation member 34 includes an autofocus motor 341 and an auto input ring 342. The autofocus motor 341 is held by the first fixed cylinder 21. In one or more embodiments of the invention, the autofocus motor 341 includes an output shaft 341b having a first gear 341a.

The auto input ring 342 is linked to the autofocus motor 341 so as to be interlocked via a gear. The auto input ring 342 has a cylindrical shape. The automatic input ring 342 has a second gear 342a meshing with the first gear 341a of the output shaft 341b on the outer circumference. The auto input ring 342 has a first roller rolling portion 342b on which a rolling roller 351b of an output ring 35 rolls, on the image side (Y direction) surface. The auto input ring 342 is disposed on the outer periphery of the first fixed cylinder 21 so as to be rotatable around the axis of the first fixed cylinder 21.

The manual focus operation member 33 rotates the cam cylinder 3 manually, and includes a manual input ring 331 and a manual operation ring 332. The manual input ring 331 has a ring plate shape. The manual input ring 331 is provided with a second roller rolling portion 331a on which the rolling roller 351b of the output ring 35 rolls on the object side (X direction) surface. The manual input ring 331 is disposed so as to be rotatable about the axis of the first fixed cylinder 21 on the image side (Y direction) of the auto input ring 342 with a predetermined interval from the auto input ring 342.

The manual operating ring 332 operates the manual input ring 331. The manual operation ring 332 has a cylindrical shape. The manual operation ring 332 has a manipulation unit 332a formed of a flange that is integrated into the inner peripheral side. The manipulation unit 332a operates the manual input ring 331 from the image side (Y direction) through the input ring biasing spring 332c.

The output ring 35 has a cylindrical shape. The output ring 35 holds the three interlocking members 351 (in FIG. 1, only one appears).

The interlocking member 351 enables the output ring 35 and auto input ring 342 as well as the output ring 35 and manual input ring 331 to operate together. The three interlocking members 351 each include a roller shaft 351a and a rolling roller 351b. The rolling roller 351b is supported in a rotatable manner by a roller shaft 351a.

Further, the output ring 35 is connected to the cam cylinder 3 by a connecting member (not shown). In between the auto input ring 342 in the axial direction of the first fixed cylinder 21 and the manual input ring 331, and on the outer circumference of the first fixed cylinder 21, the output ring 35 is disposed so that it rotates freely around the optical axis of the first fixed cylinder 21.

In the state described above, the rolling roller 351b is disposed between the first roller rolling portion 342b of the auto input ring 342 and the second roller rolling portion 33a of the manual input ring 331, and is pressed by the input ring biasing spring 332c in a pressurized state.

When the lens group 52 is moved by the autofocus operation member 34, an autofocus switch (not shown) provided in the lens barrel 1 is switched on and operated. With this, the autofocus motor 341 operates.

With the operation of the autofocus motor 341, the auto input ring 342 engaged with the first gear 341a rotates. Further, with this rotation, the rolling roller 351b rolls on the first roller rolling portion 342b. At that time, the rolling roller 351b is sandwiched between the first roller rolling portion 342b and the second roller rolling portion 331a of the manual input ring 331. At the same time, the rotation of the manual input ring 331 is restricted by the biasing force of the biasing spring 332c. Therefore, the rolling roller 351b revolves around the first fixed cylinder 21 while the rolling roller 351b rotating itself. As a result, the output ring 35 holding the rolling roller 351b rotates.

As the output ring 35 rotates, the cam cylinder 3 rotates. By rotation of the cam cylinder 3, the guide shaft 521, which has entered the guide groove 212 of the first fixed cylinder 21 and the cam groove 31 of the cam cylinder 3, moves through grooves 212 and 31, and, consequently, the lens group 52 moves in the optical axis direction (XY direction) of the first fixed cylinder 21.

On the other hand, when the lens group 52 is moved by the manual focus operation member 33, the autofocus switch is turned off to rotate the manual operation ring 332 by hand. As a result, the manual input ring 331 rotates and the rolling roller 351b rolls on the second roller rolling portion 331a. At that time, since the auto input ring 342 holding the rolling roller 351b cannot rotate by engaging with the autofocus motor 341, the rolling roller 351b revolves around the first fixed cylinder 21 while rotating and the entire output ring 35 rotates. In the same manner as described above, the cam cylinder 3 rotates and the lens group 52 can be driven in the optical axis direction (XY direction) of the first fixed cylinder 21.

The lens group holding frame 5c holds a lens group 53 having one lens or a plurality of lenses and is held in a fixed manner by the second fixed cylinder 22.

The lens group holding frame 5d (an example of a frame body) includes a frame body portion 55 and an extended portion 56. The frame body portion 55 has a cylindrical shape and holds a lens group 54 having one or more lenses. The extended portion 56 is formed so as to extend radially outwardly from the vicinity of the end portion on the image side (Y direction) of the frame main body portion 55 across the outer periphery of the frame main body portion 55. An adjuster 59 is provided from the extended portion 56 of the lens group holding frame 5d to the second fixed cylinder 22. The adjustment unit 59 adjusts the inclination in the optical axis direction (XY direction) and the position in the optical axis direction (XY direction) of the lens group 54 (an example of an optical element). In one or more embodiments of the invention, the adjuster 59 is provided at three equidistant positions along the circumferential direction of the extended portion 56. The adjustment unit 59 will be described in detail later.

An adhesive filling portion 57 is provided between the extended portion 56 of the lens group holding frame 5d and the second fixed cylinder 22. The adhesive agent filling portion 57 is provided adjacent to the adjuster 59 in the vicinity of both sides of the adjuster 59 in the circumferential direction of the extended portion 56. The second fixed cylinder 22 is provided with a projecting portion 22a projecting in the image side (Y direction). A part on both sides of the adjuster 59 in the circumferential direction of the extended portion 56 is bent from the end face on the image side (Y direction) of the extended portion 56 toward the object side (X direction) to form a bent portion 56b. The adhesive agent filling portion 57 is composed of a concave portion formed by the bent portion 56b contacting the protruding portion 22a. That is, as shown in FIG. 3, when the lens group holding frame 5d is attached to the second fixed cylinder 22 by the adjustment screw 61, as shown in FIG. 2, the outer circumferential side of the folding portion 56b is covered by the protruding portion 22a of the second fixed cylinder 22 and the adhesive filling portion 57 is formed.

As shown in FIG. 4, the adhesive filling portion 57 is seen from the image side (Y direction) in the optical axis direction (XY direction) to the radial inside of the opening 82 of the mount member 8. For this reason, the adhesive 58 can be filled into the adhesive filling portion 57 from the opening 82 of the mount member 8. The adhesive 58 is filled into the adhesive filling portion 57 after the adjustment by the adjuster 59.

The adhesive agent filling portion 57 is provided as close as possible to the adjuster 59, but it may be provided on the outer side in the radial direction of the adjuster 59 as long as it is in the vicinity of the adjuster 59. Further, a plurality of adhesive agent filling portions 57 may be provided. For example, one adhesive filling portion 57 may be provided on the outer diameter side of the adjuster 59. However, in this case, the diameter of the fixed cylinder 2 is increased in order to secure the space of the adhesive filling portion 57. In one or more embodiments of the invention, as described above, the adhesive filling portion 57 is disposed adjacent to the adjuster portion 59 in the circumferential direction. For this reason, reduction in the diameter of the fixed cylinder 2 is realized.

In one or more embodiments of the invention, the adjuster 59 is disposed at three equidistant positions along the circumferential direction of the extended portion 56 of the lens group holding frame 5d. Each adjuster 59 includes an adjustment screw 61, an biasing member 62, and the like.

The adjustment screw 61 includes a screw head 61a having a short height columnar shape and a columnar screw shaft 61f having a smaller diameter than the screw head 61a and extending from one end of the screw head 61a. The screw shaft 61f includes a positioning portion 61b, an external thread portion 61c, and a fitting portion 61d, in that order from the screw head 61a side. On the lead end face of the screw head 61a, an operation groove 61e (FIG. 4) engages, in a disengageable manner, with a tool to rotate the adjustment screw 61. The operation groove 61e extends in the radial direction and is formed at a predetermined depth.

The positioning portion 61b is formed adjacent to the screw head 61a on the screw shaft 61f of the adjustment screw 61. The positioning portion 61b has a cylindrical shape, and no screw is formed on the positioning portion 61b. The fitting portion 61d is formed on the screw tip side on the screw shaft 61f of the adjustment screw 61. The fitting portion 61d has a cylindrical shape, and there is no screw for the fitting portion 61d. The external thread portion 61c is formed between the positioning portion 61b and the fitting portion 61d.

A through hole 56a in the optical axis direction (XY direction) is formed in the extended portion 56 of the lens group holding frame 5d with a diameter allowing the screw shaft 61f of the adjustment screw 61 to be inserted therethrough.

A screw hole 23 extending in the optical axis direction (XY direction) is bored in the end face of the second fixed cylinder 22 on the image side (Y direction) toward the object side (X direction). The screw hole 23 includes an internal thread portion 23a and a hole portion 23 b. The internal thread portion 23a is formed on the image side (Y direction) of the screw hole 23. The hole portion 23b has a hollow cylindrical shape and is formed on the object side (X direction) of the internal thread portion 23a.

The screw head 61a of the adjustment screw 61 is brought into contact with the circumferential contact portion 56c of the through hole 56a of the extended portion 56, and the positioning portion 61b of the adjustment screw 61 is inserted in the through hole 56a of the extended portion 56. Further, the external thread portion 61c of the adjustment screw 61 is screwed into the internal thread portion 23a of the screw hole 23 in the second fixed cylinder 22, and the fitting portion 61d of the adjustment screw 61 is fitted in the hole portion 23b of the screw hole 23 in the second fixed cylinder 22.

The screw head 61a of the adjustment screw 61 and the through hole 56a of the extended portion 56 of the lens group holding frame 5d are formed so that the diameter of the screw head 61a is larger than the diameter of the through hole 56a. The external thread portion 61c of the adjustment screw 61 and the through hole 56a are formed such that the thread diameter of the external thread portion 61c is smaller than the diameter of the through hole 56a. The fitting portion 61d of the adjustment screw 61 and the internal thread portion 23a of the screw hole 23 are formed such that the diameter of the fitting portion 61d is smaller than the diameter of the thread of the internal thread portion 23a.

The positioning portion 61b of the adjustment screw 61 and the through hole 56a of the extended portion 56 of the lens group holding frame 5d are formed such that there is almost no gap and the positioning portion 61b is inserted into the through hole 56a. The fitting portion 61d of the adjustment screw 61 and the hole portion 23b of the screw hole 23 of the second fixed cylinder 22 are formed such that there is almost no gap and the fitting portion 61d is fitted into the hole portion 23b.

With such a configuration, being inserted in the through hole 56a of the extended portion 56 of the lens group holding frame 5d, and with the fitting portion 61d fitted into the hold portion 23b, the adjustment screw 61 can be tightened or loosened with respect to the screw hole 23 of the second fixed cylinder 22.

As shown in FIG. 2, the center of the through hole 56a of the extended portion 56 of the lens group holding frame 5d is positioned such that the radius r2 from the center O of the frame body portion 55 of the lens group holding frame 5d is smaller than the radius r1 of the opening 82 of the mount member 8, and larger than the radius r3 of the smallest portion of the cover member 9. With such a configuration, when viewed from the image side (Y direction) of the optical axis direction (X-Y direction), the groove 61e (FIG. 4) formed in the screw head 61a of the adjustment screw 61 is located in the inside of the opening 82 of the mount member 8. As a result, the operation groove 61e can be operated from the opening 82 of the mount member 8 by using a tool.

In one or more embodiments of the invention, as shown in FIG. 3, the biasing member 62 includes a compression coil spring having a size that allows the shaft of the adjustment screw 61 to be inserted therein. One end on the image side of the biasing member 62 is in contact with the object side of the contact portion 56d of the extended portion 56 of the lens group holding frame 5d. Incidentally, in FIG. 3, the image side is the Y direction, and the object side is the X direction. The other end of the biasing member 62 on the object side (X direction) is in contact with the contact portion 22b around the screw hole 23 of the second fixed cylinder 22. With this configuration, the biasing member 62 always biases the extended portion 56 of the lens group holding frame 5d to the screw head 61a of the adjustment screw 61 in a direction away from the second fixed cylinder 22 to the image side (Y direction).

Accordingly, when the adjustment screw 61 is rotated in the tightening direction, it is pushed by the screw head 61a of the adjustment screw 61 so that the lens group holding frame 5d moves against the biasing force of the biasing member 62 toward the object side (X direction). On the other hand, when the adjustment screw 61 is rotated in the loosening direction, the lens group holding frame 5d is pushed by the biasing force of the biasing member 62 and moves toward the image side (Y direction).

When one or two adjustment screws 61 of the three adjustment screws 61 are rotated, for example, in the adjuster 59 configured as described above, the direction of the axis of the lens group holding frame 5d (that is, the inclination of the optical axis of the lens group 54) is adjusted. Further, when all three adjustment screws 61 are rotated by the same amount, the lens group holding frame 5d (the lens group 54) moves in the optical axis direction (XY direction) and the position in the optical axis direction is adjusted. After the adjustment, the screw head 61a of the adjustment screw 61 may be bonded to the extended portion 56 of the lens group holding frame 5d so that the adjustment screw 61 does not rotate.

The fitting portion 61d of the adjustment screw 61 is fitted into the hole portion 23b of the screw hole 23 of the second fixed cylinder 22. Therefore, the orientation of the adjustment screw 61 is defined by the hole portion 23b of the screw hole 23 of the second fixed cylinder 22.

Allowance is provided between the thread of the external thread 61c of the adjustment screw 61 and the thread of the internal thread 23a of the threaded hole 23 of the second fixed cylinder 22. As a result, the adjustment screw 61 can be rotated smoothly. On the other hand, there is almost no gap between the fitting portion 61d of the adjustment screw 61 and the hole portion 23b of the screw hole 23 of the second fixed cylinder 22 because there is no allowance.

Therefore, without being affected by the allowance provided between the thread of the external thread 61c of the adjustment screw 61 and the thread of the internal thread 23a of the threaded hole 23 of the second fixed cylinder 22, the orientation of the adjustment screw 61 is precisely defined by the hole portion 23b of the screw hole 23 of the second fixed cylinder 22. As a result, according to one or more embodiments of the invention, compared with the case where the fitting portion 61d does not exist and the orientation of the adjustment screw 61 is defined by the internal thread portion 23a of the screw hole 23 of the second fixed cylinder 22, the accuracy of the adjustment orientation of the lens group holding frame 5d can be improved.

Further, as shown in FIG. 3, the positioning portion 61b of the adjustment screw 61 is inserted through the through hole 56a of the extended portion 56. There is also little clearance between the positioning portion 61b of the adjusting screw 61 and the through hole 56a of the extended portion 56 because allowance is unnecessary. Accordingly, the orientation of the adjustment screw 61 is defined at two places: The hole portion 23b of the screw hole 23 of the second fixed cylinder 22 and the through hole 56a of the extended portion 56. As a result, according to one or more embodiments of the invention, it is possible to further improve the accuracy of the adjustment orientation of the lens group holding frame 5d.

In the lens cylinder 1 configured as described above, the lens group holding frame 5d is attached to the second fixed cylinder 22 by the adjustment screw 61. Further, the mount member 8 is fixed to the second fixed cylinder 22 via the reinforcing member 4. In this state, for example, the adjustment screw 61 is rotated with reference to the reference end portion 81 of the mount member 8, and the inclination of optical axis of the lens group 54 held by the lens group holding frame 5d with respect to the reference end portion 81 and its position in the optical axis direction are adjusted. This adjustment is performed by engaging the tool from the opening 82 with the operation groove 61e of the adjustment screw 61.

After completion of the adjustment, the adhesive 58 is filled into the adhesive filling portion 57 from the opening 82 of the mount member 8. Since the adhesive 58 is also filled from the opening 82, it can be done in a state in which the mount member 8 is attached.

Even when, during the adjustment with the adjustment screw 61, the lens group 54 moves in the optical axis direction with respect to the second fixed cylinder 22 and the adhesive filling portion 57 moves in the optical axis direction, because the protruding portion 22a, forming the adhesive filling portion 57, is sufficiently long in the optical axis direction, the adhesive filling portion 57 does not become shallow. Due to this, it is possible to fill up with a fixed amount of the adhesive 58. As a result, the lens group holding frame 5d and the second fixed cylinder 22 are firmly adhered.

After filling with the adhesive 58, the cover member 9 is attached to the opening 82 of the mount member 8. With the cover member 9 attached, the adjuster 59 is covered with the cover member 9 when viewed from the optical axis direction. With this configuration, there is less possibility that the adjustment screw 61 will be incorrectly operated by a user or the like.

Additionally, the cover member 9 has a weaker component strength than the mount member 8 due to the material or shape of the cover member 9. For this reason, due to the attachment of the cover member 9, the mount member 8 is not modified. Specifically, in one or more embodiments of the invention, for example, the mount member 8 is made of a metallic material and the cover member 9 is made of a resin material. The thickness of the cover member 9 is smaller than the thickness of the mount member 8. With this configuration, the cover member 9 has lower strength than the mount member 8. Further, the attachment position of the cover member 9 is separated from the attachment position of the mount member 8 to the reinforcing member 4. Thereby, when the cover member 9 is attached to the mount member 8, the reinforcing member 4 is not deformed. Therefore, even if the cover member 9 is attached to the mount member 8 after the adjustment of the adjustment unit 59, there is a low possibility that the adjustment deviation is caused by the attachment.

The lens barrel 1 thus configured is attached to the camera body such that a part of the camera body abuts on the reference end portion 81 of the mount member 8 and used. In the lens barrel 1 attached to the camera body in this manner, with reference to the reference end portion 81 of the mount member 8, the direction (inclination) of the optical axis of the lens group 54 held by the lens group holding frame 5d and position in the optical axis direction are adjusted. For this reason, the lens group of the lens barrel 1 is precisely aligned with the imaging element or the like provided in the camera body.

As described above, in one or more embodiments of the invention, the fitting portion 61d of the adjusting screw 61 is fitted into the hole portion 23b of the screw hole 23 of the second fixed cylinder 22. There is almost no gap between the fitting portion 61d of the adjustment screw 61 and the hole portion 23b of the screw hole 23 of the second fixed cylinder 22 because there is no allowance. Therefore, according to one or more embodiments of the invention, the accuracy of the adjustment orientation of the lens group holding frame 5d can be improved.

Further, in one or more embodiments of the invention, the positioning portion 61b of the adjusting screw 61 is inserted through the through hole 56a of the extended portion 56. There is also little clearance between the positioning portion 61b of the adjusting screw 61 and the through hole 56a of the extended portion 56 because allowance is unnecessary. Accordingly, the orientation of the adjustment screw 61 is defined at two places: The hole portion 23b of the screw hole 23 of the second fixed cylinder 22 and the through hole 56a of the extended portion 56. For this reason, according to one or more embodiments of the invention, it is possible to further improve the accuracy of the adjustment orientation of the lens group holding frame 5d. As a result, according to one or more embodiments of the invention, a high performance lens barrel 1 can be provided.

Modified Embodiments (1) In the above embodiments, the shape of the through hole 56a of the extended portion 56 of the lens group holding frame 5d is not limited to a circular shape in the plan view as seen in the optical axis direction (XY direction).

Figure 5:
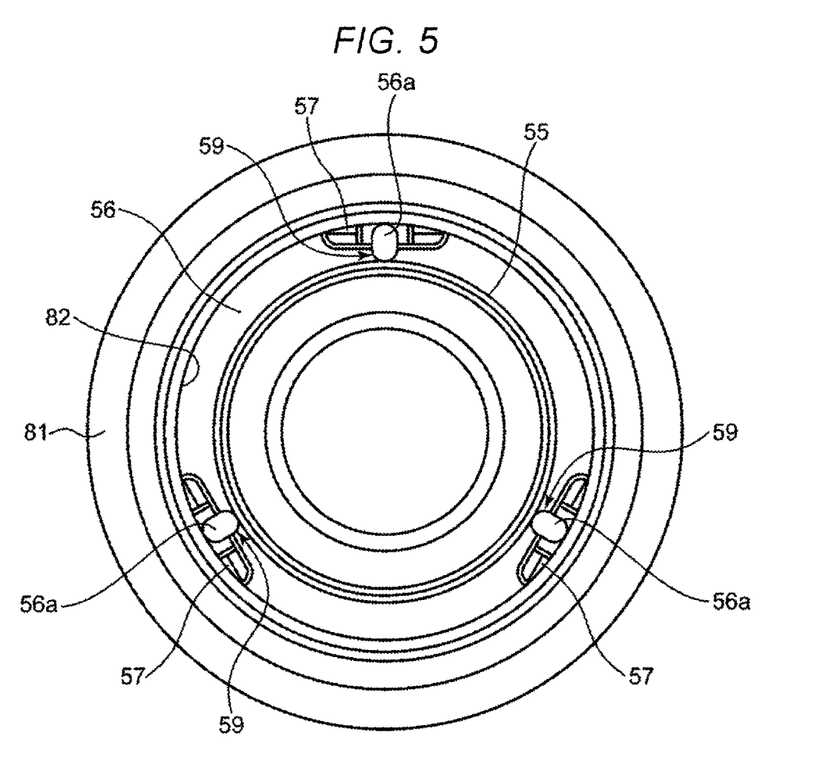
FIG. 5 is a view of the opening portion of the mount member of the lens barrel, as viewed from the image side in one or more modified embodiments.

FIG. 5 is a view of the opening portion of the mount member of the lens barrel in one or more modified embodiments as seen from the image side. FIG. 5 shows a state in which the adjustment screw 61 is detached so that the shape of the through hole 56a formed in the extended portion 56 of the lens group holding frame 5d can be known. As shown in FIG. 5, the through hole 56a is formed in the circumferential direction of the frame main body portion 55 of the lens group holding frame 5d in plan view as viewed from the image side (Y direction) to the optical axis direction (XY direction) and is formed in a long hole whose length in the radial direction is longer than the length. That is, the long axis of the through hole 56a which is an elongated hole is along the radial direction.

In the above embodiments, as described above, the fitting portion 61d of the adjustment screw 61 is fitted in the hole portion 23b of the screw hole 23 of the second fixed cylinder 22, and the orientation of the adjustment screw 61 is defined by the hole portion 23b which the fitting portion 61d fits into. In this configuration, the position of the lens group holding frame 5d (for example, the position of the lens group holding frame 5d in the vertical direction in FIG. 2) in the plane orthogonal to the optical axis direction (XY direction) is set so that the fitting portion 61d is defined by the hole portion 23b which it fits into.

In this case, if the shape of the through hole 56a of the extended portion 56 in a plan view is circular and there is almost no clearance between the through hole 56a and the positioning portion 61b of the adjustment screw 61, the lens group holding frame 5d can be over-constrained. When the lens group holding frame 5d becomes over-constrained, an unexpected amount of force is applied to the lens group holding frame 5d. In that case, there is a possibility that the lens group holding frame 5d may be deformed after a lapse of time.

On the other hand, in one or more modified embodiments of FIG. 5, the shape of the through hole 56a of the extended portion 56 is formed as an elongated hole in plan view. As a result, a gap is formed between the through hole 56a of the extended portion 56 and the positioning portion 61b of the adjustment screw 61. Therefore, it is possible to avoid excessive restraint of the lens group holding frame 5d. As a result, deformation of the lens group holding frame 5d can be prevented in advance.

In one or more modified embodiments of FIG. 5, the fitting portion 61d of the adjustment screw 61 is fitted in the hole portion 23b of the screw hole 23 in the second fixed cylinder 22, and there is almost no space between the fitting portion 61d of the adjustment screw 61 and the hole portion 23b of the screw hole 23 in the second fixed cylinder 22. Because of that, according to one or more modified embodiments of FIG. 5, in the same manner as in the above-mentioned embodiments, it is possible to improve the accuracy of the adjustment orientation of the lens group holding frame 5d.

(2) In the above embodiments, the biasing member 62 is disposed adjacent to the adjustment screw 61, but the arrangement position of the biasing member 62 can be at a position away from the adjustment screw 61. Further, in the above embodiments, the biasing member 62 is composed of a compression coil spring, but the present invention is not limited thereto. The biasing member 62 may be, for example, a tension spring. In essence, the biasing member 62 biases the extended portion 56 of the lens group holding frame 5d toward the screw head 61a of the adjustment screw 61 in a direction away from the second fixed cylinder 22 to the image side (Y direction).

(3) In the above embodiments and the modified embodiments shown in FIG. 5, the adjuster 59 is disposed at three equidistant positions along the circumferential direction of the extended portion 56 of the lens group holding frame 5d, but the adjusters 59 do not have to be arranged equidistantly. The adjustment unit 59 may be provided at three positions along the circumferential direction of the extended portion 56 of the lens group holding frame 5d.

(4) In the above-described embodiments, the adjustment unit 59 is disposed at three positions along the circumferential direction of the extended portion 56 of the lens group holding frame 5d, but the adjustment unit 59 does not have to be provided at three positions. The adjusting unit 59 may be disposed at one location of the extended portion 56 of the lens group holding frame 5d. The extended portion 56 of the lens group holding frame 5d may be fixed to the second fixed cylinder 22 at the other two positions of the adjuster 59.

Also in this configuration, it is possible to adjust the inclination of the lens group 54 in the optical axis direction (XY direction) by tightening or loosening the adjustment screw 61 at one position.

(5) In the above embodiments, the lens barrel 1 is used with the camera body connected to the mount member 8, but it is not limited to the camera body. The member attached to the mount member 8 may be a fixing member having at least one optical element different from the lens group 54 held by the lens group holding frame 5d.

(6) In the above embodiments, the lens barrel 1 includes four lens groups, but the present invention is not limited thereto. The lens barrel 1 may have one to three or five or more lens groups.

(7) In the above embodiments, the adjustment unit 59 is provided in the lens group holding frame 5d, but the present invention is not limited to this. The adjusting unit 59 may be provided in another lens group holding frame.

According to one or more embodiments of the invention, a lens barrel capable of precisely adjusting the inclination of the optical element with respect to the optical axis direction is provided.

Although embodiments of the present invention have been described and illustrated in detail, it is clearly understood that the same is by way of illustration and example only and not limitation, the scope of the present invention should be interpreted by terms of the appended claims.

What is claimed is:

1. A lens barrel comprising:
   a frame body that holds an optical element;
   a cylindrical frame holder that holds the frame body, and
   an adjuster that adjusts an inclination of the frame body with respect to a predetermined axis of the frame body holder so that an optical axis of the optical element is parallel to the predetermined axis of the frame body holder,
   the adjuster further comprising:
      an adjustment screw comprising a screw head and a threaded shaft formed with an external thread portion;

an internal thread portion, extending along a direction parallel to the optical axis, that is formed on the frame body holder to be screwed together with the external thread portion;

a through hole bored in the frame body along a direction parallel to the optical axis;

a contact portion provided at a circumferential portion of the through hole to be brought into contact with the screw head when the screw shaft is inserted in the through hole, and a hole portion formed in the frame body holder and that is continuous with the internal thread portion, wherein the screw shaft comprises a fitting portion that extends from the external thread portion toward the screw tip of the adjustment screw and fits into the hole portion.

2. The lens barrel according to claim 1, wherein a biasing member, disposed between the frame body and frame body holder, biases the frame body away from the frame body holder so that the contact portion comes in contact with the screw head.

3. The lens barrel according to claim 1, wherein the frame body holder and the adjusting screw are each made of metal.

4. The lens barrel according to claim 3, wherein the internal thread portion is formed in advance in the frame body holder.

5. The lens barrel according to claim 1, wherein the screw shaft further includes a positioning portion that is inserted in the through hole, and the positioning portion is formed between the screw head and the external thread portion.

6. The lens barrel according to claim 1, wherein the adjuster is provided at three positions along a circumferential direction of the frame body holder.

7. The lens barrel according to claim 6, wherein a through hole is formed as an elongated hole whose length in the radial direction is longer than the length in the circumferential direction of the frame body holder in a plan view as seen from a direction parallel to the optical axis.

* * * * *